(12) United States Patent
Maus et al.

(10) Patent No.: US 8,173,268 B2
(45) Date of Patent: May 8, 2012

(54) HONEYCOMB BODY HAVING RADIALLY DIFFERENTLY CONFIGURED CONNECTING POINTS

(75) Inventors: Wolfgang Maus, Bergisch Gladbach (DE); Peter Hirth, Rösrath (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/941,131

(22) Filed: Nov. 8, 2010

(65) Prior Publication Data

US 2011/0105317 A1    May 5, 2011

Related U.S. Application Data

(63) Continuation of application No. PCT/EP2009/054904, filed on Apr. 23, 2009.

(30) Foreign Application Priority Data

May 7, 2008  (DE) .......................... 10 2008 022 518

(51) Int. Cl.
  *B32B 3/12* (2006.01)
  *B01D 39/00* (2006.01)
(52) U.S. Cl. .......................... 428/593; 428/116; 55/523

(58) Field of Classification Search .................. 428/116, 428/593
See application file for complete search history.

(56) References Cited

U.S. PATENT DOCUMENTS 5,328,774 A *  7/1994  Maus et al. .................. 428/593
6,500,393 B2  12/2002  Nakamori et al.

FOREIGN PATENT DOCUMENTS

DE  19900148 A1  7/1999
EP   0590171 A1  4/1994

OTHER PUBLICATIONS

International Search Report dated Aug. 5, 2009.

* cited by examiner

*Primary Examiner* — Jennifer C McNeil
*Assistant Examiner* — Adam Krupicka
(74) *Attorney, Agent, or Firm* — Laurence A Greenberg; Werner H. Stemer; Ralph E. Locher

(57) ABSTRACT

A honeycomb body includes a housing and a honeycomb structure with a plurality of channels. The honeycomb structure is formed by at least one at least partially structured metallic layer which forms connecting points that fix the honeycomb structure in place. A cross section of the honeycomb structure has radial zones with the connecting points. At least 1% and no more than 20% of inner contact points of the at least one at least partially structured metallic layer in the cross section form a connecting point in at least one zone. The connecting points have lengths in a structure direction being different in at least two radial zones.

6 Claims, 4 Drawing Sheets

HONEYCOMB BODY HAVING RADIALLY DIFFERENTLY CONFIGURED CONNECTING POINTS

CROSS-REFERENCE TO RELATED APPLICATION

This is a continuation, under 35 U.S.C. §120, of copending International Application No. PCT/EP2009/054904, filed Apr. 23, 2009, which designated the United States; this application also claims the priority, under 35 U.S.C. §119, of German Patent Application DE 10 2008 022 518.5, filed May 7, 2008; the prior applications are herewith incorporated by reference in their entirety.

BACKGROUND OF THE INVENTION

Field of the Invention

The present invention relates to a honeycomb body having at least a housing and a honeycomb structure with a multiplicity of channels. The honeycomb structure is formed of at least one at least partially structured metallic layer. The metallic layer forms connecting points with itself and/or with adjacent layers, for fixing the honeycomb structure. Such honeycomb bodies are used, for example, as catalyst carrier bodies for exhaust-gas purification units in mobile exhaust systems.

In the exhaust-gas purification of internal combustion engines, such as for example diesel or spark-ignition engines, honeycomb bodies have the advantage of having a particularly large surface area, so that very close contact is ensured between the exhaust gas flowing through and the channel walls. That surface area, which is formed fundamentally by the channel walls, is often coated with suitable, if appropriate different catalysts in order to enable a conversion of pollutants contained in the exhaust gas.

Honeycomb bodies of that type may fundamentally be produced from ceramic or metallic material. Recently, however, the metallic catalyst carrier body has become particularly favored because, in that case, it is possible to work with very thin materials, for example sheet-metal foils with a thickness of less than 80 μm or even less than 50 μm. Such thicknesses provide a very large geometric surface area and a significantly reduced pressure loss of the exhaust gas flow as it flows through the honeycomb body as compared to ceramic carrier structures. A further advantage is that, in that case, a very simple connection to the rest of the exhaust system (for example an exhaust pipe) is likewise made possible, because in each case metallic materials are combined with one another.

A honeycomb structure of that type is, however, subjected to a multiplicity of different loadings over its life cycle in a mobile exhaust system. In that case, it should also be taken into consideration that specifically the superposition of the partially extreme loadings enduringly influences the durability of such honeycomb bodies. For example, thermal loading, such as for example the extreme temperature peaks (up to over 1000° C.), the considerable rate of change of temperature during heating and cooling, and the temperature distribution of the inflowing exhaust-gas flow, can be a significant factor. That likewise applies with regard to mechanical loading, specifically for example with regard to the maximum acceleration level, the frequency range of the excitation with regard to the eigen or natural frequencies, and also the gas dynamic loading as a result of gas pulsation. That makes it clear that specifically the connecting regions of the individual components (sheet-metal foils, housing, . . . ) of such a honeycomb body to one another are subjected to particularly high loadings, and should where possible withstand the constantly changing thermal and/or dynamic loadings for a very long time.

Connecting techniques are known in which brazing material (as a brazing foil, brazing powder and/or brazing paste) is positioned in certain zones of a honeycomb body of that type in order to connect the metallic components to one another. Strip-shaped encircling zones are often formed between the housing and the sheet-metal foils of the honeycomb body, wherein the zones may extend over a part of the axial length or over the entire axial length of the honeycomb body or of the housing. In order to connect the sheet-metal foils to one another, it may likewise be considered known for them to be connected to one another over the entire cross section in an axial partial region of the honeycomb body. In addition and/or alternatively thereto, it is also possible to form zones (as viewed from the end side) which encompass a multiplicity of channels in which an areal connection is formed. It is thus possible to generate end-side patterns, for example in the manner of concentric rings, strips, triangles or other areal formations.

Even though a multiplicity of different proposals has already been made with regard to the construction of such a brazing pattern, with respect to durability, they cannot withstand all of the presently prevailing conditions in the exhaust system of a motor vehicle. In specifying a structure for the brazing pattern of a honeycomb body of that type, it is possible to take into consideration a multiplicity of different criteria in order to obtain firstly adequate flexibility and secondly durability of the honeycomb structure. Furthermore, in producing a brazing pattern of that type, it should also be taken into consideration that the brazing connections must be realized in such a way that they can be reproduced, precisely positioned and produced by using a reliable process.

SUMMARY OF THE INVENTION

It is accordingly an object of the invention to provide a honeycomb body having radially differently configured connecting points, which overcomes the hereinafore-mentioned disadvantages and at least partially solves the highlighted problems of the heretofore-known devices of this general type. In particular, it is sought to specify a honeycomb body which has a considerably improved service life under the extreme thermal and dynamic loadings in the exhaust system of an automobile. In this case, in particular, the connecting points should be disposed relative to one another in such a way that targetedly flexible regions are realized in the interior of the honeycomb body, so that for example the radial expansion behavior of the honeycomb structure can be adjusted in a targeted fashion. The honeycomb body should thus, for example, also have considerably improved thermoshock characteristics and/or improved vibration characteristics.

With the foregoing and other objects in view there is provided, in accordance with the invention, a honeycomb body, comprising a housing and a honeycomb structure. The honeycomb structure has a cross section with radial zones and at least one at least partially structured metallic layer with a structure direction. The at least one at least partially structured metallic layer defines a multiplicity of channels and inner contact points in the cross section. At least 1% and at most 20% of the inner contact points of the at least one at least partially structured metallic layer in at least one of the zones each form a respective connecting point for fixing the honeycomb structure. The connecting points have lengths in the structure direction and the lengths in at least two of the radial zones differ from one another.

With regard to the number of channels, it is preferable for the honeycomb body to be formed with a channel density per square inch (cpsi) in the range of from 100 to 1000, in particular from 200 to 600. It is also preferable for a plurality of smooth and structured (for example corrugated) metallic layers (for example in the form of sheet-metal foils) to be used to produce the honeycomb body. Even though sheet-metal foils of this type can, for example, be coiled or wound in spiral fashion, it is however preferable for the sheet-metal foils to have a profile differing therefrom, for example an S-shaped, V-shaped, W-shaped, U-shaped or similar profile. The configuration of the sheet-metal foils relative to one another is then carried out in such a way that they ultimately uniformly fill out the (round, oval or similar) cross section of the honeycomb body. The sheet-metal foils are then connected to one another (in a form-locking fashion) at various positions, so-called connecting points. These connecting points preferably involve a brazed connection, in particular a high-temperature vacuum brazed connection. These connecting points thus define the relative position of the metallic layers with respect to one another in such a way that the honeycomb structure is substantially fixed in the housing. A force-locking connection is one which connects two elements together by force external to the elements, as opposed to a form-locking connection which is provided by the shapes of the elements themselves.

The honeycomb body can now be divided into a plurality of radial zones, with connecting points being formed only to a very limited extent at least in one zone. In the radial zone, a multiplicity of inner contact points of the at least one metallic layer are thus formed (for example in the manner of a circular ring). The contact points are usually formed by virtue of a section of a structured metallic layer bearing against another section of an adjacent metallic layer (smooth and/or structured). The contact points are thus often contact lines, which run in the direction of a structure, of the adjacent sections of metallic layers. In the at least one zone, at most 20% of the contact points are now used to form the connecting points for fixing the honeycomb structure and no connection is formed (at least in the cross section being considered) at the other contact points. The proportion of connecting points is preferably less than 10% or even 5% of the contact points.

Furthermore, it is proposed in this case that the connecting points extend along a structure, specifically along the inner contact points, specifically with different lengths in at least two radial zones. It is preferable in this case for the length of the connecting points to always be shorter than the contact line. In this case, it is clear that this always refers to a state in which the honeycomb structure is inserted into the housing, specifically at room temperature. In this case, the zones are preferably selected in such a way that they cross a plurality of metallic layers, for example extend over at least five metallic layers. The different lengths of the connecting points may now vary in a stepped manner, that is to say for example the length of the connecting points in a first zone is a multiple larger/smaller than in a further radial zone. It is, however, also possible to realize a continuous increase and/or a continuous decrease in the length of the connecting points in adjacent zones.

In accordance with another feature of the invention, it is very particularly preferable for the length of the connecting points in one radial zone to be smaller than in a radial zone situated further outward in the direction of a radius of the honeycomb structure. This means in other words that the length of the connecting points increases in the outward direction, that is to say becomes larger. In this case, it is fundamentally also possible for another radial zone to be formed in between, in which the length of the connecting points is smaller than in the inner radial zone, but another radial zone with a larger length of the connecting points is finally realized further outward.

In accordance with a further feature of the invention, it is also proposed that the length of the connecting points be smallest in a center of the honeycomb structure and largest in an outer radial zone. Such a honeycomb body is constructed, in particular, with regard to the alternating thermal loadings. A contrary embodiment would be advantageous, for example, if the vibration characteristics were of primary importance.

In accordance with an added feature of the invention, in one refinement, it is proposed that the connecting points in at least one radial zone be formed with a reduced length in relation to the connecting points of the two adjacent zones. This relates, in particular, to the situation in which three or more radial zones are formed, wherein preferably the radial zone disposed adjacent the outermost radial zone is formed with the reduced length. It is thereby possible to produce a flexible region in which, in particular, axially different thermal expansion characteristics due to different thermal loadings can be compensated. The conduction of heat in the radial direction may possibly also be reduced in this way. Likewise, the provision of a large length of the connecting points in the outermost zone permits a secure connection, for example to the housing.

In accordance with an additional feature of the invention, it is also proposed that the connecting points each have a central point, with the central points of the connecting points of one radial zone being offset in the direction of the structure in relation to central points of the connecting points of another radial zone. The structure generally runs substantially parallel to the axis of the honeycomb body, in such a way that in this case the length of the connecting points and/or the position of the central points can, if appropriate, also be viewed in relation to the axis. This also means in other words that not only the lengths of the connecting points in the radial direction differ but rather also the positions of the connecting points with regard to the axial position in the honeycomb structure. For example, the central points are formed more in the vicinity of one or the other end side of the honeycomb structure.

In accordance with a concomitant feature of the invention, it is very particularly preferable for the honeycomb structure to have a central axis and end sides, with the central points of the connecting points of a radial zone close to the axis being disposed closer to an end side than the central points of the connecting points in at least one zone radially further remote from the axis. This means in other words, for example, that the connecting points close to the center are positioned adjacent one and/or the other end side. The connecting points radially at the outside, which are, in particular, formed so as to be longer, are in contrast positioned with their central points closer to the center between the two end surfaces.

A honeycomb body of this type is very particularly preferably used in an exhaust-gas treatment unit, in particular in that of a motor vehicle.

Other features which are considered as characteristic for the invention are set forth in the appended claims, noting that the features specified individually in the claims may be combined with one another in any desired, technologically meaningful way and form further embodiments of the invention.

Although the invention is illustrated and described herein as embodied in a honeycomb body having radially differently configured connecting points, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The description, in particular in conjunction with the figures, explains the invention further and specifies additional particularly preferred structural variants of the invention.

DETAILED DESCRIPTION OF THE INVENTION

Figure 1:
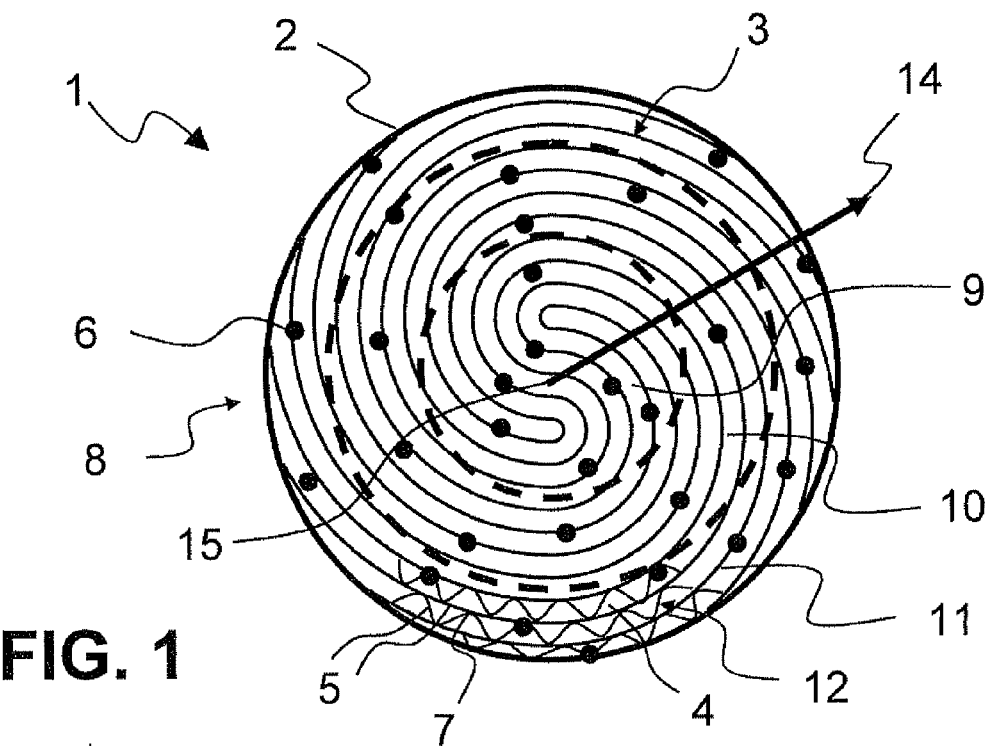
FIG. 1 is a diagrammatic, cross-sectional view of a structural variant of a honeycomb body.

Referring now in detail to the figures of the drawings, which are not intended to restrict the invention, and first, particularly, to FIG. 1 thereof, there is seen a cross section 8 of a honeycomb body 1. In this case, the honeycomb body 1 is formed with a round housing 2 in the form of a metal tube in which a honeycomb structure 3 is positioned. The honeycomb structure 3 is formed with a multiplicity of smooth and corrugated metallic layers 5, which in this case are disposed in an S-shaped configuration. Several channels 4, which are formed through the use of the metallic layers 5, are generated in particular due to a corrugated structure 12 of the structured metallic layer 5. In this case, the channels 4, like the structure 12, run substantially perpendicular to a radius 14 of the honeycomb body 1, that is to say in this case into the plane of the drawing.

The cross section 8 may be divided, for example proceeding from its center 15, into a plurality of zones, specifically for example into a first radial zone 9, a second radial zone 10 and a third radial zone 11. In this case, the zones are formed in the manner of circles or circular rings, although a construction differing therefrom is likewise possible. As is diagrammatically indicated in this case in a portion at the bottom, the zones cover a plurality of metallic layers 5 in the direction of the radius 14. The metallic layers 5 in one zone, as is illustrated in this case by way of example for the third zone 11, form a row of contact points 7, which are formed in particular linearly along the extrema (peaks and valleys) of the structure 12. As is indicated in this case (purely diagrammatically), only very few connecting points 6 are formed. In the variant shown in FIG. 1, in all of the zones, at least 1% and at most 20% of the contact points 7 of the metallic layers 5 with one another form a contact point 6.

Figure 2:
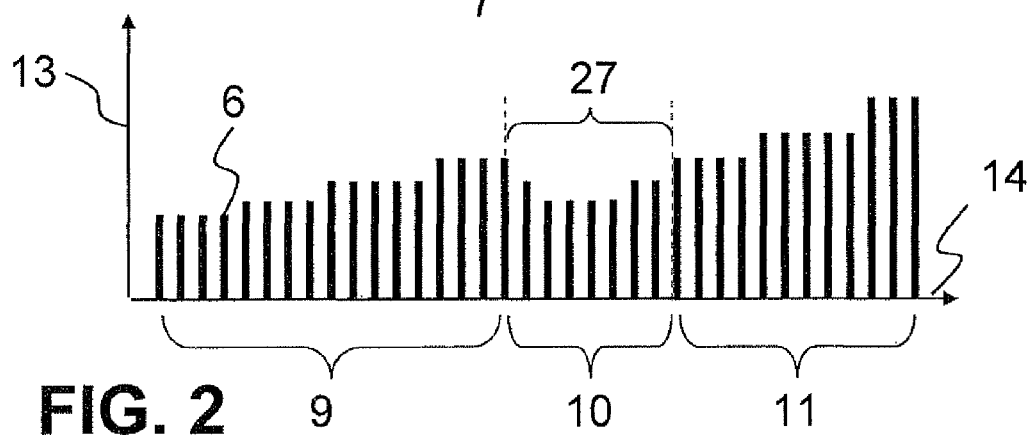
FIG. 2 is a diagram illustrating different lengths of connecting points in the direction of the radius.

FIG. 2 illustrates a diagram which is intended to depict a length 13 of the connecting points 6 in the individual zones, by way of example. In this case, the abscissa represents the radius 14, while the ordinate represents the lengths 13 of the connecting points 6. Proceeding from the center, the length 13 of the connecting points 6 in the first zone 9 is firstly illustrated at the left in the diagram. In this case, the length is chosen so as to rise in a stepped fashion in the radially outward direction. Adjoining this is the length 13 of the connecting points 6 in the second zone 10. In this case, the second zone 10 constitutes a flexible region 27, with the length 13 in this case being chosen to be smaller than in the direct vicinity within the first zone 9. Likewise, the third zone 11, which is situated radially further outward, is in turn formed with a greater length 13 of the connecting points 6. A stepped rise in the length 13 of the connecting points 6 can again be seen within the third zone 11, with the longest connecting points 6 over the entire cross section also being provided in this case. Merely for the sake of completeness, it is pointed out that the differences in length are merely shown diagrammatically in this case, but the differences may also be considerably larger or possibly smaller.

Figure 3:
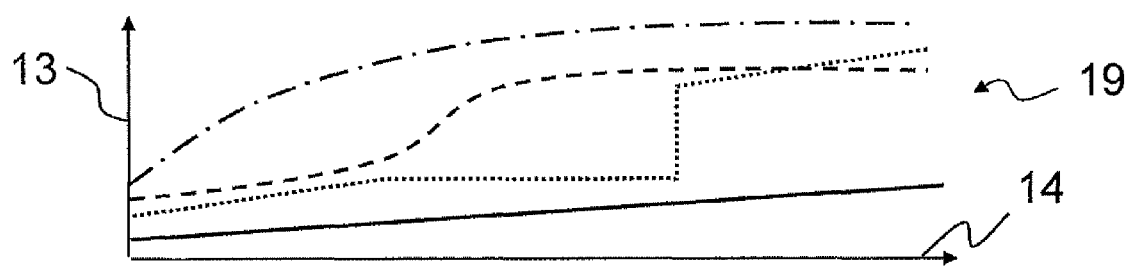
FIG. 3 is a further diagram with further profile illustrations for the lengths of the connecting points.

An imaginary envelope is formed by considering the profile of the peaks of the individual connecting points 6 in FIG. 2, which can be regarded as a length profile over the radius 14. A plurality of possible length profiles 19 over the radius 14 are illustrated by way of example in FIG. 3. A first length profile 19 is depicted by a solid line. That length profile is constructed so as to rise continuously and constantly. In the case of the embodiment of the length profile 19, an arbitrary number of radial zones may be formed, with the condition of mutually different or rising lengths of the connecting points 6 nevertheless being realized. A further length profile 19 is illustrated thereabove through the use of a dotted line. In this case, for example, a rise in the length 13 can be seen in a first zone, and a constant length can be seen in a second zone, before an abrupt rise and a further rising length 13 is realized in a third zone. A further length profile 19 is illustrated thereabove through the use of a dashed line, with a rise in length being duly evident across all of the zones, but with the rise taking place with a different rate of increase in the different zones. Finally, at the very top, a dash-dotted line indicates a final length profile 19, which replicates a type of saturation curve.

Figure 4:
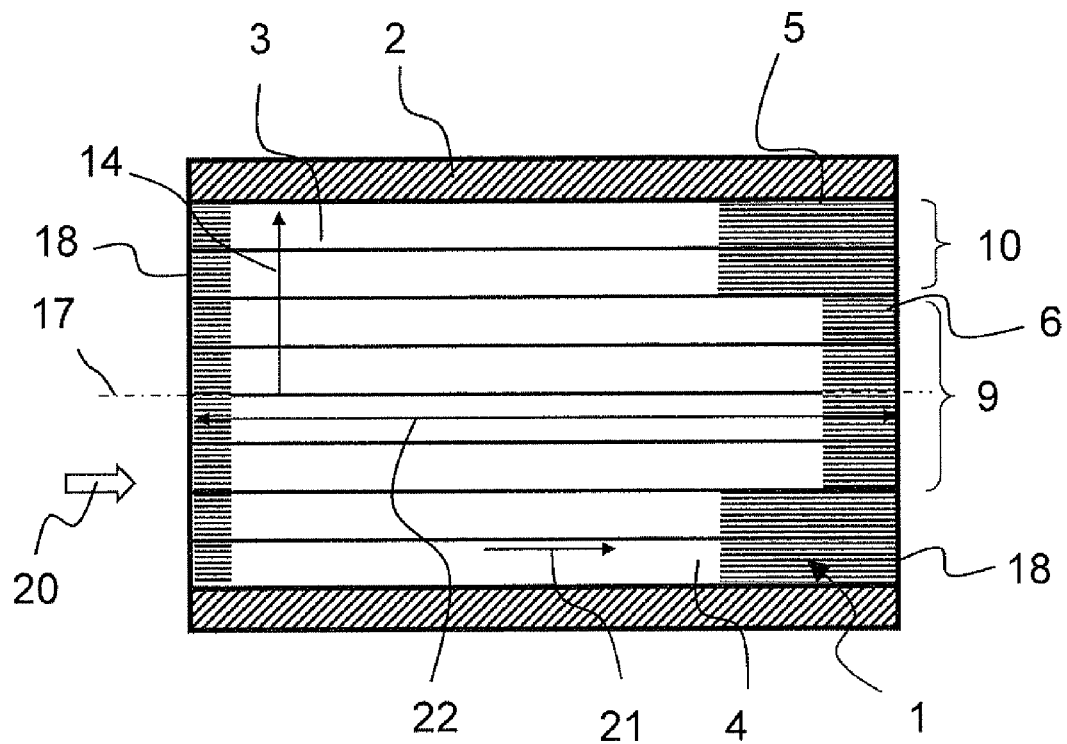
FIG. 4 is a longitudinal-sectional view of an embodiment of the honeycomb body according to the invention.

FIG. 4 diagrammatically shows a longitudinal section through an embodiment of a honeycomb body 1 of this type. The honeycomb body 1 is in turn delimited at the outside by a housing 2 in which the honeycomb structure 3 is positioned. The honeycomb structure 3 has a multiplicity of channels 4 which extend between end sides 18. In this case, an extent 22 of the honeycomb structure 3 is also defined by the end sides 18. In the structural variant shown herein, a channel direction of an extent 21 of the channels 4 is parallel to a central axis 17 of the honeycomb structure 3. The radius 14 is indicated perpendicular to the axis 17.

In this case, it is shown in a longitudinal section how the position of the individual connecting points or locations 6 lie in relation to the axis 17, the end sides 18 and/or the extent 22. In this case, a connecting region is formed adjoining the region of the end side 18 which is impinged upon by the exhaust gas in a flow direction 20, with the connecting points 6 being relatively short, for example less than 10 mm, or even less than 5 mm. On the opposite end side 18, a plurality of connecting points 6 which have a first length are formed in a first zone 9 formed concentrically around the axis 17. The connecting points 6 are formed with a greater length in a second zone 10 which is formed in the manner of a circular ring around the first zone 9, as is indicated in this case by the longer hatching. For clarification, it is pointed out in this case that no large-area connections are realized therein. The hatching is thus purely schematically representative of the connecting points 6. In this case, linear connecting points 6 are basically formed only at a predefined number of contact points of the adjacent metallic layers 5.

Figure 5:
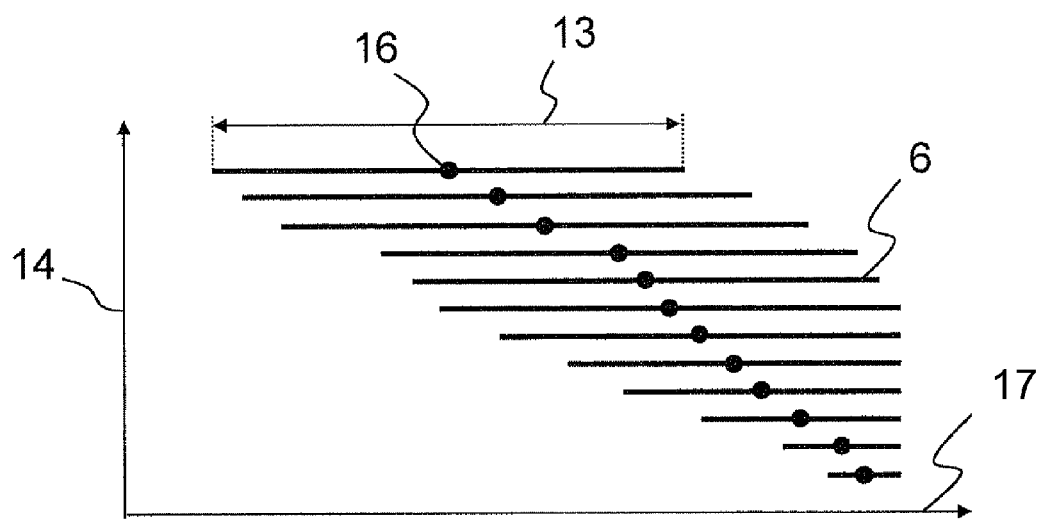
FIG. 5 is a diagram illustrating axial positions of the connecting points.

FIG. 5 schematically illustrates the length and position of the connecting points 6 by way of example, for a possible portion of such a longitudinal section of a honeycomb structure. In the diagram of FIG. 5, the abscissa represents the axis 17 and the ordinate represents the radius 14. In this case, the connecting points 6 close to the axis 17 are formed with a shorter length 13 than the connecting points 6 situated further remote from the axis 17. A central point 16 is likewise indicated for each connecting point 6. It can be seen that the connecting points 6 which are disposed radially at different locations have central points 16 which are also offset with respect to one another in the direction of the axis 17.

Figure 6:
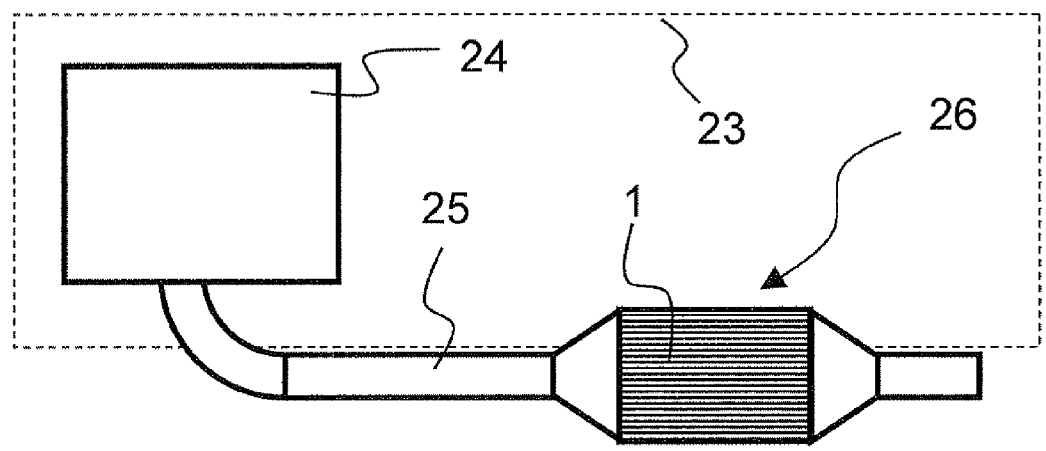
FIG. 6 is a plan view of a motor vehicle having an exhaust system.

FIG. 6 diagrammatically shows a motor vehicle 23 having an internal combustion engine 24, for example a diesel engine or a spark-ignition engine. The exhaust gas generated in the internal combustion engine 24 flows through an exhaust system 25 to at least one exhaust-gas treatment unit 26, with the latter being formed in this case with the honeycomb body 1 according to the invention. Consideration is given in particular to catalytic converters, adsorbers, filters, particle separators, reformers, heaters or the like as the exhaust-gas treatment units.

Figure 7:
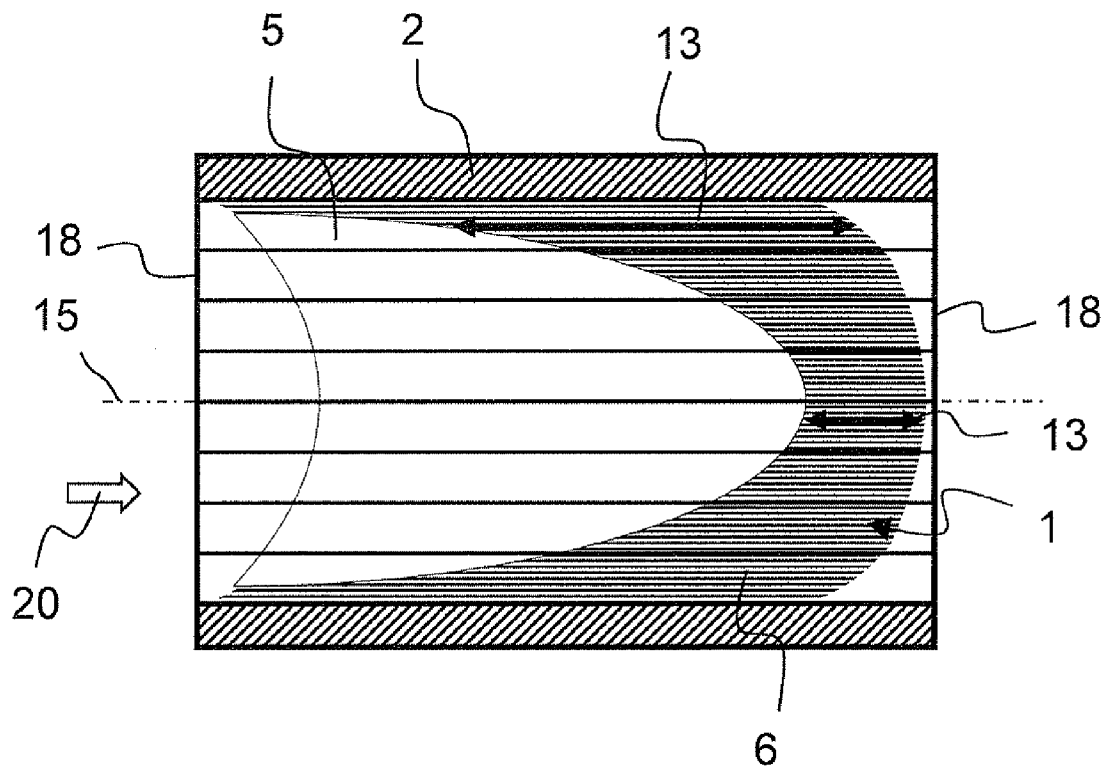
FIG. 7 is a longitudinal-sectional view of a further structural variant of the honeycomb body according to the invention.

FIG. 7 shows a further structural variant of a honeycomb body 1 in a longitudinal section. In this case, the connecting points or locations 6 are formed in such a way that the connecting points 6 positioned close to the center 15 of the honeycomb structure 1 are formed with a shorter length 13 than those positioned close to the housing 2. Furthermore, the connecting points 6 close to the center 15 are positioned with their central points closer to the end side 18 from which the exhaust gas emerges in the flow direction 20. This is different in the radial edge region, because in this case, the connecting points 6 are disposed more centrally between the two end sides 18.

Figure 8:
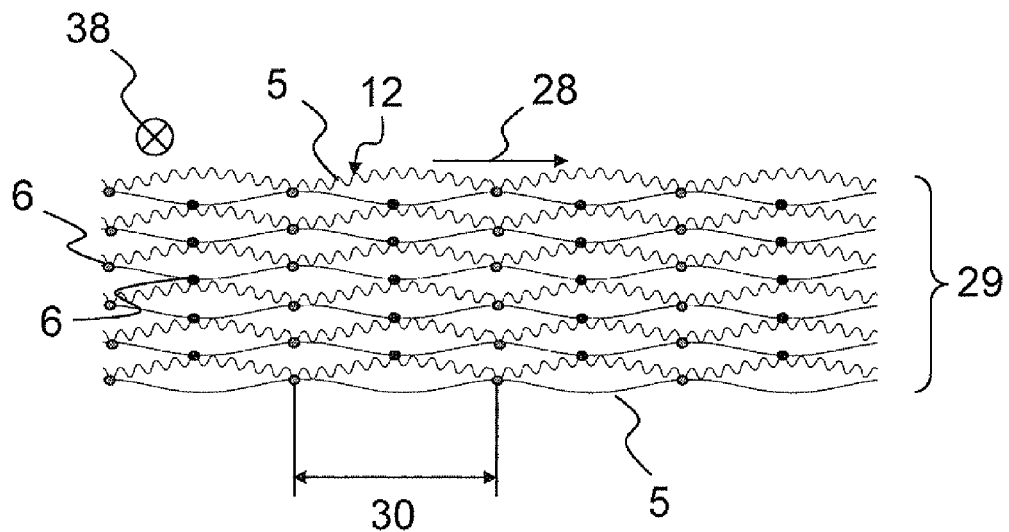
FIG. 8 is a fragmentary, side-elevational view of a structural variant of a stack for a honeycomb body according to the invention.

FIG. 8 shows a stack 29 having a multiplicity of structured and smooth metallic layers 5 (for example in the form of sheet-metal foils and/or metallic superfine-wire nonwovens). In this case, the stack 29 is illustrated in a still-unwound state, that is to say it has a substantially rectilinear layer profile 28. The connecting points or locations 6 of the metallic layers to one another are also illustrated, with different coloring. As a result of the fact that the formation of such connecting points 6 (brazed connections) first takes place in the assembled state, that is to say in the wound state, in the interior of the housing, FIG. 8 shows, in particular, the positions for an adhesive agent on which, for example, powdered brazing material is positioned after a coiling or winding process. The brazing material ultimately serves to generate top-side connecting points (marked in this case by dark points) and bottom-side connecting points (marked in this case by light points), which are illustrated therein by way of example and illustratively, in relation to the structured metallic layers 5. In order to position the adhesive agent and/or the brazing material, use may be made in particular of a printing process, for example in the form of an inkjet process.

It is shown at the bottom in FIG. 8 that the bottom-side connecting points 6 of the same type, that is to say in this case to the bottom smooth layer 5, form a predefined distance 30 which, for example in the direction of the layer profile 28, amounts to at least 20 mm and/or includes a multiplicity of structure extrema (wave peaks or crests and wave troughs or valleys, for example at least 20 wave peaks). Even though a regular configuration of the connecting points 6 is shown herein, this is not imperatively necessary. Conventionally, the structure 12 of a corrugated metallic layer 5 bears in each case against a smooth metallic layer 5, in such a way that the structure 12 forms contact lines or contact points on the smooth layer 5 in a structure profile direction 38, that is to say perpendicularly to the layer profile 28. The illustration in FIG. 8 is intended to show that, in the event of a force acting on the metallic layers 5 perpendicular to the layer profile 28 during later operation, expansion joints 37 can be formed which thereby permit a considerably more flexible honeycomb structure and a better adaptation to the thermal and dynamic loading characteristics of the honeycomb structure.

Figure 9:
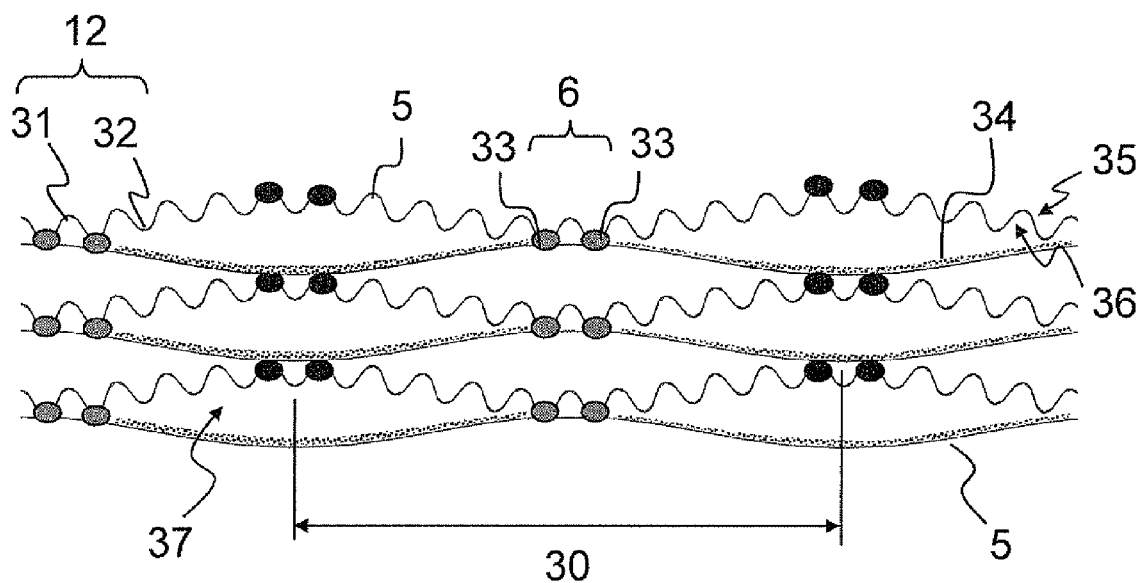
FIG. 9 is an enlarged, fragmentary, side-elevational view of another structural variant of a stack for a honeycomb body.

FIG. 9 shows a variant in which each connecting point 6 is formed with two brazing points 33 on adjacent structure extrema (elevations 31 or depressions 32). A multiplicity of structure extrema of the structured metallic layer 5 is provided between the connecting points 6. It is pointed out at this juncture that the number of structure extrema between the identical connecting points 6 (illustrated in the same color) in the direction of the layer profile 28 is normally considerably higher than that illustrated in this case by way of example. In particular, at least fifteen (15) structure extrema are situated in between.

Furthermore, it can be seen from FIG. 9 that the smooth metallic layers 5 may be formed with a coating 34 which in particular prevents (undesired) diffusion connection of the adjacent metallic layers 5 that regularly bear against one another during use. Even though the coating is preferably provided on a top side 35 and a bottom side 36 of the smooth and/or corrugated metallic layer 5, the provision for example of an oxide layer on one side may suffice in exceptional situations. At any rate, it should be ensured in this way that a connection of the metallic layers, for example as a result of diffusion, is prevented, and relatively large expansion joints 37 can consequently form under loading. In other words, it is possible as a construction rule to provide that such an expansion joint 37 is formed, for example, with a section of a smooth metallic layer 5 and a section of a structured metallic layer 5, with the expansion joint 37 being delimited by two identical connecting points (shown in this case for bottom-side connecting points), and furthermore with an expansion joint delimitation through the use of the structured metallic layer 5 being formed with at least fifteen (15) structure extrema. This provides a particularly high degree of deformability of the expansion joint 37 or a flexible configuration of the adjacent sheet-metal foils, specifically both in the direction of the layer profile 28 and also perpendicular thereto. The number of brazing points per connecting point 6 is limited to a maximum of three, in particular even to two, and the embodiment of a connecting point 6 with precisely one brazing point is particularly preferable.

The invention claimed is:

1. A honeycomb body, comprising:
  a housing;
  a honeycomb structure disposed in said housing;
  said honeycomb structure having a cross section with radial zones and at least one at least partially structured metallic layer with a structure direction, said at least one at least partially structured metallic layer defining a multiplicity of channels and inner contact points in said cross section;

at least 1% and at most 20% of said inner contact points of said at least one at least partially structured metallic layer in at least one of said zones each forming a respective connecting point for fixing said honeycomb structure; and said connecting points having lengths in said structure direction, said lengths in at least two of said radial zones differing from one another.

2. The honeycomb body according to claim 1, wherein said honeycomb structure has a radial direction, and said lengths of said connecting points in one of said radial zones are smaller than in another of said radial zones situated further outward in said radial direction.

3. The honeycomb body according to claim 1, wherein said honeycomb structure has a center, one of said radial zones is an outer radial zone, and said lengths of said connecting points are smallest in said center and largest in said outer radial zone.

4. The honeycomb body according to claim 1, wherein said connecting points in at least one of said radial zones have a reduced length relative to said connecting points in two of said radial zones adjacent thereto.

5. The honeycomb body according to claim 1, wherein said connecting points each have a central point, and said central points of said connecting points of one of said radial zones are offset in said structure direction relative to said central points of said connecting points of another of said radial zones.

6. The honeycomb body according to claim 5, wherein said honeycomb structure has a central axis and end sides, and said central points of said connecting points of one of said radial zones close to said axis are disposed closer to one of said end sides than said central points of said connecting points in at least one of said radial zones radially further remote from said axis.

\* \* \* \* \*